3,012,046
Patented Dec. 5, 1961

3,012,046
3-MONO AND 20 - MONO - OXIMES OF 11β - HYDROXY-5β-PREGNANE-3,20-DIONE AND THEIR CORRESPONDING 11α - METHYL, 11α - ALLYL AND 11α-METHALLYL DERIVATIVES
William J. Wechter and Louis C. Schroeter, Kalamazoo, and Donald R. Buhler, Portage Township, Kalamazoo County, Mich., assignors to The Upjohn Company, Kalamazoo, Mich., a corporation of Delaware
No Drawing. Filed Mar. 28, 1961, Ser. No. 98,790
11 Claims. (Cl. 260—397.45)

The present invention relates to new steroid compounds and is more particularly concerned with the 3-mono- and 20-mono-oximes of 11β-hydroxy-5β-pregnane-3,20-dione and their corresponding 11α-methyl, 11α-allyl and 11α-methallyl derivatives.

The new compounds and processes of this invention are illustratively represented by the following formulae:

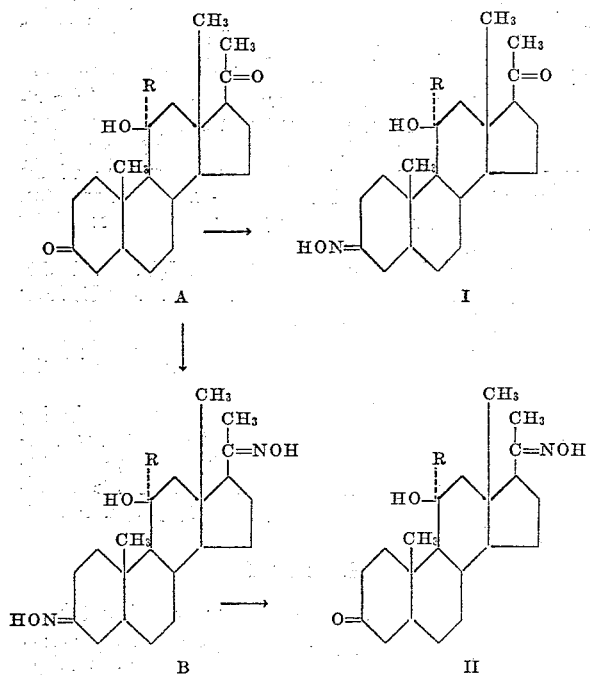

wherein R is selected from the group consisting of hydrogen, methyl, allyl and methallyl.

The compounds of the present invention, i.e., the 3-mono- and 20-mono-oximes of 11β-hydroxy-5β-pregnane-3,20 - dione, 11α - methyl-11β-hydroxy-5β-pregnane-3,20-dione, 11α-allyl-11β-hydroxy-5β-pregnane-3,20-dione and 11α - methallyl-11β-hydroxy-5β-pregnane-3,20-dione, are central nervous system depressants useful as tranquilizers, muscle relaxants and sedatives in the treatment of hypertension, nervous disorders and related illnesses in both humans and valuable domestic animals. These compounds exist and can be used in both hydrated or anhydrous form.

The compounds of the present invention can be prepared and administered to mammals, birds, humans and animals in a wide variety of oral and parenteral dosage forms, singly, or in admixture with other coacting compounds. They can be associated with a carrier which can be a solid material or a liquid in which the compound is dissolved, dispersed or suspended. The solid compositions can take the form of tablets, powders, capsules, pills, or the like, preferably in unit dosage forms for simple administration or precise dosages. The liquid compositions can take the form of solutions, emulsions, suspensions, syrups, or elixirs.

The 3,20-dione 3-mono-oxide compounds (I) of the present invention are prepared from their corresponding 3,20-diketo compounds (A) by 3-mono-oximation, e.g., by reaction with a hydroxylamine mineral acid salt in an acid medium.

Starting materials employed in the process for preparing the 3-mono-oxides of the present invention are the known 11β-hydroxy-5β-pregnane-3,20-dione (J. Amer. Chem. Soc. 75, 486 [1953]), 11α-methyl-11β-hydroxy-5β-pregnane-3,20-dione (synthesized in the manner described in U.S. Patent 2,944,069), 11α-allyl-11β-hydroxy-5β-pregnane-3,20-dione (prepared as in Example 3 of U.S. Patent 2,897,198), and 11α-methylallyl-11β-hydroxy-5β-pregnane-3,20-dione (prepared as in Example 4 of U.S. Patent 2,897,198).

The process of this invention for the production of 3-mono-oximes differs considerably from the method commonly employed in the preparation of 3,20-dione bis-oximes. The 3-mono-oximes of the present invention as well as the 3,20-bisoximes produced by the usual method are both prepared from their corresponding 3,20-diketo compounds by reaction with a hydroxylamine mineral acid salt, but unlike the process for the preparation of 3,20-bisoximes, wherein basic solvents such as pyridine, collidine, N,N-dimethylaniline and the like are utilized, these basic solvents are avoided in the present invention and the reaction is carried out instead in an acid medium. Also, in the present 3-mono-oxime process approximately equimolar equivalents of steroid compound and hydroxylamine mineral acid salts are employed, while in the conventional 3,20-bisoximes process an excess of hydroxylamine, usually from two to six molar equivalents is preferred.

The 3-mono-oximation reaction is preferably carried out at 20 to 120° C., and conveniently at the reflux temperature of the reaction mixture. Under these conditions the reaction time is usually from 15 minutes to 8 hours. Both higher and lower temperatures and shorter and longer reaction times are operative, the lower temperature usually requiring a correspondingly longer reaction time.

The 11β - hydroxy - 5β - pregnane-3,20-dione 3-mono-oxime, 11α - methyl-11β-hydroxy-5β-pregnane-3,20-dione 3-mono-oxime, 11α-allyl-11β-hydroxy-5β-pregnane - 3,20-dione 3-mono-oxime and 11α-methallyl-11β-hydroxy-5β-pregnane-3,20-dione 3-mono-oxime, thus produced, can be isolated from the reaction mixture by conventional methods, for example, when a water-missible solvent is used, by pouring the reaction mixture into water and separating the resultant precipitate by filtration. Additional purification of the product can be accomplished by conventional methods, for example, by single solvent elution chromatography from an adsorbent column with a suitable solvent, such as, acetone, methanol, dilute methanol, ethanol, ether, methylene chloride; also by gradient elution chromatography from an adsorbent column with a suitable mixture of solvents, such as, methylene chloride-Skellysolve B (hexanes), acetone-Skellysolve B, and the like.

The 20-mono-oxide compounds (II) of the present invention are prepared from the corresponding 3,20-bis-oximes (B) by 3-deoximation, e.g., by reaction with an α-keto acid (a compound containing the monovalent CO·COOH radical).

Starting materials employed in the process for preparing the 20-mono-oximes of the present invention are 11α-methyl - 11β - hydroxy-5β-pregnane-3,20-dione bisoxime (prepared in the manner disclosed in the copending application of Fonken, S.N. 23,360, filed April 20, 1960), 11β-hydroxy-5β-pregnane-3,20-dione bisoxime (prepared in the manner disclosed in the copending application of Fonken, S.N. 23,360, filed April 20, 1960), 11α-allyl-11β-hydroxy-5β-pregnane-3,20-dione bisoxime (synthesized in the manner disclosed below in Preparation 1), and 11α-methallyl-11β-hydroxy-5β-pregnane-3,20-dione bisoxime (synthesized in the manner disclosed below in Preparation 2).

The process of the present invention for preparing the 20-mono-oxime compounds comprises treating the corresponding 3,20-bisoximes with an α-keto acid such as α-ketopropionic acid (pyruvic acid), α-ketobutyric acid, α-ketophenylpropionic acid and the like, in a suitable solvent such as formamide or dimethylformamide.

The 3-deoximation reaction is preferably carried out about 20 to about 120° C., and conveniently at the room temperature of the reaction mixture. Under these conditions the reaction time is usually from about 15 minutes to about 12 hours. Both higher and lower temperatures and shorter and longer reaction times are operative, the lower temperature usually requiring a correspondingly longer reaction time.

The 11β - hydroxy - 5β - pregnane - 3,20 - dione 20-mono-oxime, 11α - methyl - 11β - hydroxy - 5β - pregnane - 3,20 - dione 20 - mono - oxime, 11α - allyl - 11β-hydroxy - 5β - pregnane - 3,20 - dione 20 - mono-oxime and 11α - methallyl - 11β - hydroxy - 5β - pregnane-3,20 - dione 20 - mono-oxime, thus produced, can be isolated from the reaction mixture by conventional methods, for example, by pouring the reaction mixture into water and separating the resultant precipitate by filtration. Additional purification of the product can be accomplished by conventional methods, for example, by single solvent elution chromatography from an adsorbent column with a suitable solvent, such as, methanol, acetone, dilute methanol, ethanol, ether, methylene chloride; also by gradient elution chromatography from an adsorbent column with a suitable mixture of solvents, such as, methylene chloride-Skellysolve B (hexanes), acetone-Skellysolve B, and the like.

PREPARATION 1

11α-allyl-11β-hydroxy-5β-pregnane-3,20-dione bisoxime (B)

A mixture of 10 g. of 11α-allyl-11β-hydroxy-5β-pregnane-3,20-dione bis(ethylene ketal) (prepared in the manner disclosed in Example 1 of U.S. Patent 2,897,198) and 10 g. of hydroxylamine hydrochloride in 50 ml. of dry pyridine and 50 ml. of absolute ethanol was heated to reflux temperature for a period of about 6 hours. The solution thus obtained was then poured into 1.5 l. of ice water and refrigerated for a period of about three hours. The precipitate thus obtained was collected on a sintered glass funnel, washed thoroughly with water and dried in a vacuum oven giving crude 11α-allyl-11β-hydroxy-5β-pregnane-3,20-dione bisoxime, a white solid. The crude product was then recrystallized from methylene chloride-Skellysolve B hexanes giving 6.1 g. (70% yield) of 11α-allyl-11β-hydroxy-5β-pregnane-3,20-dione bisoxime melting at 148 to 154° C. A second crop of 990 mg. (11% yield) of crystals of 11α-allyl-11β-hydroxy-5β-pregnene-3,20-dione bisoxime was obtained. An analytical sample was prepared by recrystallizing the product of the principal crop twice from methylene chloride, giving pure 11α-allyl-11β-hydroxy-5β-pregnane-3,20-dione bisoxime (B) having a melting point of 155–160° C. and infrared absorption maxima at 3520, 3300 sh., 3240, 3120, 1673 sh., 1663, 1635, 997, 963, 943, 927, 915, 897, and 893 cm.$^{-1}$.

PREPARATION 2

11α-methallyl-11β-hydroxy-5β-pregnane-3,20-dione bisoxime (B)

A stoichiometric equivalent amount of 11α-methallyl-11β-hydroxy-5β-pregnane-3,20-dione bis(ethylene ketal) (prepared in the manner disclosed in Example 2 of U.S. Patent 2,897,198) is substituted for 11α-allyl-11β-hydroxy-5β-pregnane-3,20-dione bis(ethylene ketal) in the procedure of Preparation 1, to obtain 11α-methallyl-11β-hydroxy-5β-pregnane-3,20-dione bisoxime (B), a light-colored crystalline solid.

EXAMPLE 1

11α-methyl-11β-hydroxy-5β-pregnane-3,20-dione 3-oxime (I)

A solution of 695 mg. (0.01 mole) of hydroxylamine hydrochloride in about 5 ml. of water was added to 3.46 g. (0.01 mole) of 11α-methyl-11β-hydroxy-5β-pregnane-3,20-dione (A) dissolved in about 75 ml. of alcohol. The resulting solution was heated to reflux for a period of about 30 minutes and then allowed to remain at room temperature for about 18 hours. The reaction mixture was poured into water and the product allowed to solidify. The solid material was washed thoroughly by grinding in a mortar with water and dried at 60° C. in vacuo; yield 3.0 g., melting point 89 to 102° C. (decomposition). This material was recrystallized from ethanol-water at room temperature to give colorless leaves with a melting point of 109 to 114° C. (decomposition) and a yield of 1.67 g. This compound, 11α-methyl-11β-hydroxy-5β-pregnane-3,20-dione 3-oxime (I), was recrystallized to provide an analytical sample and had a melting point of 109.0 to 114.0 C. (decomposition) and an infrared spectrum consistent with its proposed structure; its optical rotatory dispersion exhibited a strong positive cotton effect (indicative of a free 20-ketone) and its nuclear magnetic resonance confirmed that the structure of the compound contained 21-$CH_3$ and 20-carbonyl functions. Bush A papergram of the compound showed essentially a single spot.

*Analysis.*—Calcd. for $C_{22}H_{35}O_3N \cdot \frac{1}{2}H_2O$: C, 71.36; H, 9.79; N, 3.78; $H_2O$, 2.50. Found: C, 71.49; H, 9.61; N, 3.75; $H_2O$ (Karl Fischer) 2.65.

Heating the hydrated compound in a vacuum oven yielded the corresponding anhydrous compound with the empirical formula: $C_{22}H_{35}O_3N$.

Following the procedure of Example 1 but substituting for the starting 11α-methyl-11β-hydroxy-5β-pregnane-3,20-dione (A) other 11α-lower-alkyl-11β-hydroxy-5β-pregnane-3,20-diones (A), is productive of the corresponding 11α-lower-alkyl-11β-hydroxy-5β-pregnane-3,20-dione 3-oximes (I).

EXAMPLE 2

11β-hydroxy-5β-pregnane-3,20-dione 3-oxime (I)

Following the procedure of Example 1, but employing 11β-hydroxy-5β-pregnane-3,20-dione (A) (Oliveto et al., J. Amer. Chem. Soc., 75, 486 [1953]) as starting material, is productive of 11β-hydroxy-5β-pregnane-3,20-dione 3-oxime (I).

EXAMPLE 3

11α-allyl-11β-hydroxy-5β-pregnane-3,20-dione 3-oxime (I)

Following the procedure of Example 1, but employing 11α-allyl-11β-hydroxy-5β-pregnane-3,20-dione (A) (prepared in the manner disclosed in Example 3 of U.S. Patent 2,897,198) as starting material, is productive of 11α - allyl - 11β - hydroxy - 5α - pregnane - 3,20 - dione 3-oxime (I).

EXAMPLE 4

11α-methallyl-11β-hydroxy-5β-pregnane-3,20-dione 3-oxime (I)

Following the procedure of Example 1, but employing 11α - methallyl - 11β - hydroxy - 5β - pregnane - 3,20-dione (A) (prepared in the manner disclosed in Example 4 of U.S. Patent 2,897,198) as starting material, is productive of 11α-methallyl-11β-hydroxy-5β-pregnane-3,20-dione 3-oxime (I).

EXAMPLE 5

*11α - methyl - 11β - hydroxy - 5β - pregnane - 3,20 - dione 20-oxime (II)*

Ten ml. of 50% aqueous pyruvic acid was added under nitrogen to a solution of 4.8 g. of 11α-methyl-11β-hydroxy-5β-pregnane-3,20-dione bisoxime (B) in 20 ml. of dimethylformamide. Brief warming yielded a solution which was allowed to stand at room temperature for about 18 hours. This material was then poured into 250 ml. of water and the crude amorphous solid isolated, ground in a mortar with water, washed and dried in vacuo at a temperature of about 60° C. The product was isolated by pouring it on a column of Florisil (synthetic magnesium silicate) and employing gradient elution chromatography with mixtures of solvents composed of from 5 to 50% acetone in Skellysolve B (hexane hydrocarbons). The isolated product was crystallized from ethanol-water and gave a white crystalline solid, 11α-methyl-11β-hydroxy-5β-pregnane-3,20-dione 20-oxime (II), having an infrared spectrum showing a strong OH (broad) band, CO (1700 cm.$^{-1}$) and oxime bands (ca. 900 cm.$^{-1}$); no strong positive cotton effect curve was exhibited by optical rotatory dispersion (indicative of 20-ketone oximation).

Following the procedure of Example 5 but substituting for the starting 11α-methyl-11β-hydroxy-5β-pregnane-3,20-dione bisoxime (B) other 11α-lower-allyl-11β-hydroxy-5β-pregnane-3,20-dione bisoximes (B) is productive of the corresponding 11α-lower-alkyl-11β-hydroxy-5β-pregnane-3,20-dione 3-oximes (II).

EXAMPLE 6

*11β-hydroxy-5β-pregnane-3,20-dione 20-oxime (II)*

Following the procedure of Example 5, but employing 11β-hydroxy-5β-pregnane-3,20-dione bisoxime (B) as starting material, is productive of 11β-hydroxy-5β-pregnane-3,20-dione 20-oxime (II).

EXAMPLE 7

*11α - allyl - 11β - hydroxy - 5β - pregnane - 3,20 - dione 20-oxime (II)*

Following the procedure of Example 5, but employing 11α - allyl - 11β - hydroxy - 5β - pregnane - 3,20- dione bisoxime (B) (obtained as in Preparation 1) as starting material, is productive of 11α-allyl-11β-hydroxy-5β-pregnane-3,20-dione 20-oxime (II).

EXAMPLE 8

*11α - methallyl - 11β - hydroxy - 5β - pregnane - 3,20 - dione 20-oxime (II)*

Following the procedure of Example 5, but employing 11α - methallyl - 11β - hydroxy - 5β - pregnane - 3,20-dione bisoxime (B) (obtained as in Preparation 2) as starting material, is productive of 11α-methallyl-11β-hydroxy-5β-pregnane-3,20-dione 20-oxime (II).

We claim:

1. 11β-hydroxy-5β-pregnane-3,20-dione 3-oximes of the formula

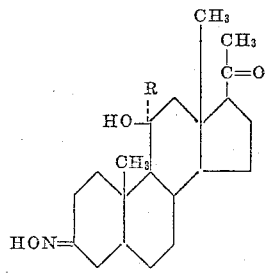

wherein R is selected from the group consisting of hydrogen, methyl, allyl and methallyl.

2. 11β-hydroxy-5β-pregnane-3,20-dione 3-oxime.
3. 11α-methyl-11β-hydroxy-5β-pregnane-3,20-dione 3-oxime.
4. 11α-methyl-11β-hydroxy-5β-pregnane-3,20-dione 3-oxime·½H$_2$O.
5. 11α-allyl-11β-hydroxy-5β-pregnane-3,20-dione 3-oxime.
6. 11α-methallyl-11β-hydroxy-5β-pregnane - 3,20-dione 3-oxime.
7. 11β-hydroxy-5β-pregnane-3,20-dione 20-oximes of the formula

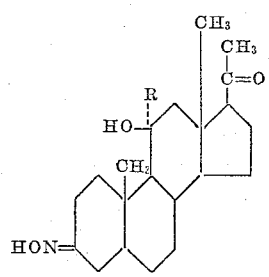

wherein R is selected from the group consisting of hydrogen, methyl, allyl and methallyl.

8. 11β-hydroxy-5β-pregnane-3,20-dione 20-oxime.
9. 11α-methyl-11β-hydroxy-5β-pregnane-3,20-dione 20-oxime.
10. 11α - allyl - 11β - hydroxy - 5β - pregnane - 3,20-dione 20-oxime.
11. 11α - methallyl - 11β - hydroxy - 5β - pregnane - 3,20-dione 20-oxime.

References Cited in the file of this patent

UNITED STATES PATENTS

| | | |
|---|---|---|
| 2,335,616 | Tendrick et al. | Nov. 30, 1943 |
| 2,447,463 | Hershberg | Aug. 17, 1948 |

OTHER REFERENCES

Oliveto et al.: J.A.C.S., vol. 78, 1736–38 (1956).

UNITED STATES PATENT OFFICE
CERTIFICATE OF CORRECTION

Patent No. 3,012,046            December 5, 1961

William J. Wechter et al.

It is hereby certified that error appears in the above numbered patent requiring correction and that the said Letters Patent should read as corrected below.

Column 2, line 1, for "3-mono-oxide" read -- 3-mono-oxime; line 7, for "3-mono-oxides" read -- 3-mono-oximes --; line 59, for "20-mono-oxides" read -- 20-mono-oxime --; column 6, lines 30 to 39, the formula should appear as shown below instead of as in the patent:

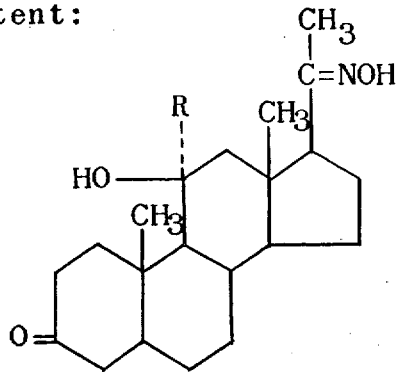

Signed and sealed this 8th day of May 1962.

(SEAL)
Attest:

ERNEST W. SWIDER            DAVID L. LADD
Attesting Officer            Commissioner of Patents